United States Patent Office 3,110,528
Patented Nov. 12, 1963

3,110,528
SHAFT BEARINGS
Kenneth George Parker, Shepperton, England, assignor to C.A.V. Limited, London, England
Filed May 14, 1962, Ser. No. 194,454
Claims priority, application Great Britain May 16, 1961
3 Claims. (Cl. 308—122)

This invention relates to bearings for shafts, more particularly shafts which are intended to be rotated at high speeds, and of the kind wherein the shaft is supported within a bearing bush which in turn is rotatably supported within a relatively fixed body, the arrangement being such that when the shaft is rotated the bush will be rotated at a lesser speed.

The object of the invention is to provide a bearing of the aforesaid kind whereby risk of wear due to particles in the lubricating oil will be minimised.

According to the invention in a bearing of the kind specified an annular passage for lubricant is defined between the internal periphery of the body and the bush, said annular passage being in register with passages extending through the wall of the bush to the clearance between the latter and the shaft, and there is formed in the body an inlet to the circumferential passage and a substantially tangentially disposed restricted outlet from the passage, the arrangement being such that particles in lubricant entering the annular groove through the inlet will be caused to move outwardly by centrifugal forces and to be discharged through the outlet.

Figure 1:
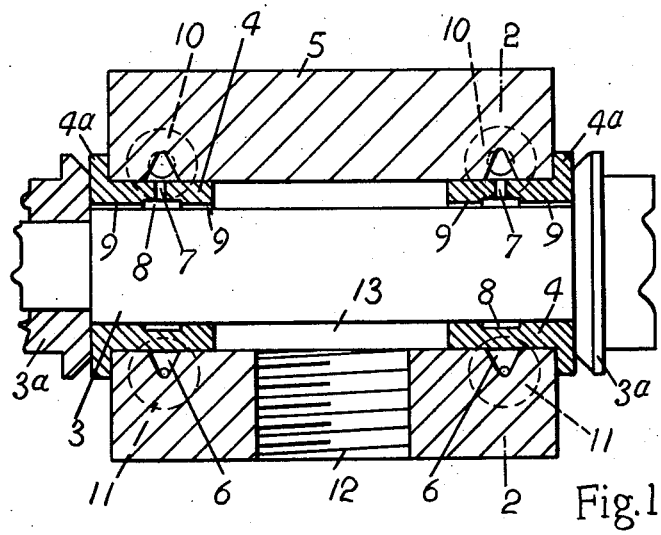
Figure 2:
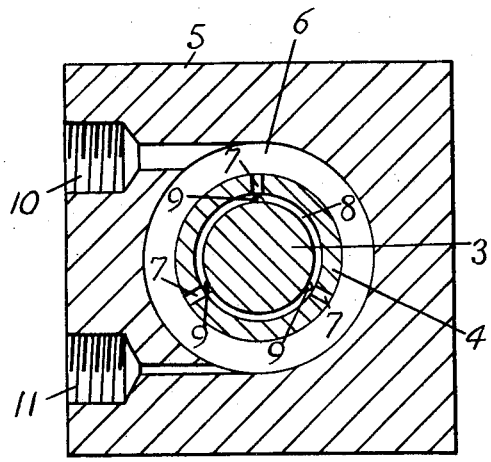

An example of the invention as applied to a bearing for the rotor shaft of a turbo-charger, will now be described with reference to the accompanying drawings in which FIGURE 1 is a longitudinal sectional view, and FIGURE 2 is a section on the line 2—2 of FIGURE 1.

The shaft 3 is rotatably supported in a pair of bushes 4 which are themselves rotatably supported in opposite ends of a cylindrical bore in a body part 5. The bushes 4 and the shaft 3 are located against axial movement by a pair of collars 3ª secured to the shaft at opposite sides of the body part and bearing against flanges 4ª formed on the outer ends of the bushes and bearing against the ends of the body part 5. The arrangement of parts is such that when the turbo-charger is in use the bushes 4 will rotate at about half the speed of the shaft 3 and in the same direction.

A pair of V-section circumferential grooves 6 are formed in the wall of the bore near the ends of the body part 5 and communicate with radial passages 7 formed in the adjacent bushes. The radial passages 7 in each bush are in communication with a circumferential groove 8 in the internal periphery of the bush, the circumferential groove 8 being in communication with longitudinally extending grooves 9 in the bush. A pair of oil inlets 10 formed in the body part enter respectively the grooves 6 tangentially near their outermost peripheries; and a pair of restricted oil outlets 11 formed in the body part extend parallel to the inlets and also enter the grooves 6 tangentially near their outermost peripheries but at points diametrically opposite the inlets. The inlets 10 and outlets 11 communicate with the adjacent grooves 6 in such a sense that oil entering and leaving the grooves will flow in the same direction as the rotation of the bushes. There is also a main outlet 12 formed in the body part and opening from the annular space 13 intermediate the bushes. When the turbo-charger is in use and oil is fed into the pair of inlets 10, the grooves, the clearance between the bushes and the shaft and between the bushes and the wall of the bore, and the annular space between the bushes are all filled with oil. Oil will be swept around the grooves 6 by the rotation of the bushes. Hence, owing to their circular motion, particles of dirt contained in the oil will be flung to the apices of the grooves and will therefore be discharged through the horizontal outlets which are connected to a point downstream of the main outlet 12 so that all the oil flowing through the bearing will be directed to an oil cooler. By such an arrangement risk of the particles entering the clearances between the bushes and body part and between the bushes and shaft is minimised with consequential minimisation of wear on the bearing.

Having thus described my invention what I claim as new and desire to secure by Letters Patent is:

1. A bearing of the kind specified for a rotatable shaft, comprising in combination with the shaft, a fixed body part provided with a cylindrical bore, a freely floatable bush which is rotatably supported by said body part within said bore, and through which said shaft extends so that said shaft is rotatably supported by the inner periphery of said bush, and when said shaft is rotated it causes said bush to rotate in the same direction at a lower speed than said shaft, means for preventing axial movement of said bush relative to said body part, a plurality of radial passages formed in said bush intermediate the ends thereof, a first circumferential passage formed in the wall of said bore, and communicating with the outer ends of said radial passages, a second circumferential passage formed in the inner periphery of said bush, and communicating with the inner ends of said radial passages, a lubricant inlet formed in said body part, and a restricted outlet formed in said body part, said inlet and said outlet being in tangential communication with said first circumferential passage at different positions so that lubricant admitted to said first circumferential passage through said inlet is caused to flow in the same direction as the rotation of said bush, and any solid particles in the lubricant within said first circumferential passage are caused to be moved outwardly by centrifugal forces and to be discharged through said outlet.

2. A bearing of the kind specified for a rotatable shaft, comprising in combination with the shaft, a fixed body part provided with a cylindrical bore, a pair of freely floatable bushes which are rotatably supported by said body part within opposite ends of said bore, and through which said shaft extends so that said shaft is rotatably supported by the inner peripheries of said bushes, and when said shaft is rotated it causes said bushes to rotate in the same direction as said shaft at a lower speed than the latter, a pair of flanges which are formed respectively on, and extend radially outwards from, the outer ends of said bushes, and which bear against adjacent outer sides of said body part, a pair of collars secured on said shaft, and bearing respectively against the outer sides of said flanges to prevent axial movement of said bushes relative to said body part, a plurality of radial passages formed in each of said bushes intermediate the ends thereof, a pair of circumferential passages which are formed in the wall of said bore at positions wherein one of said circumferential passages communicates with the outer ends of the radial passages in one of said bushes, and the other of said circumferential passages communicates with the outer ends of the radial passages in the other of said bushes, a pair of additional circumferential passages which are formed respectively in the inner peripheries of said bushes at positions wherein each of said pair of additional circumferential passages communicates with the inner ends of the radial passages in the same bush, a pair of lubricant inlets formed in said body part, and a pair of restricted outlets formed in said body part, one of said inlets and one of said outlets being in tangential communication with one of the first mentioned pair of circumferential passages at different positions, and the other of said inlets and the other of said outlets being in tangential communication with the other of the first mentioned pair of circumferential passages at different positions, so that lubricant admitted to the first mentioned pair of circumferential passages through said inlets is caused to flow in the same direction as the rotation of said bushes, and any solid particles in the lubricant within the first mentioned pair of circumferential passages are caused to be moved outwardly by centrifugal forces and to be discharged through said outlets.

3. A bearing according to claim 2, wherein the inner peripheries of said bushes are formed with longitudinal grooves, and said body part is formed with an additional outlet in communication with the cylindrical bore in said body part at a position between said bushes.

References Cited in the file of this patent
UNITED STATES PATENTS
2,566,080     Davids _____ Aug. 28, 1951